United States Patent [19]

Svendsen et al.

[11] Patent Number: 5,174,610
[45] Date of Patent: Dec. 29, 1992

[54] HLVP TURBINE AND HOSE COOLING APPARATUS

[75] Inventors: John M. Svendsen, Corcoran; John J. Anderley, Anoka; Peter L. Frank, Hamel, all of Minn.

[73] Assignee: Wagner Spray Tech Corporation, Minneapolis, Minn.

[21] Appl. No.: 733,225

[22] Filed: Jul. 22, 1991

[51] Int. Cl.[5] ............................................. F16L 55/00
[52] U.S. Cl. ....................................... 285/13; 285/924; 285/41; 285/401; 239/13; 239/132; 239/128
[58] Field of Search ................ 285/13, 14, 41, 924, 285/401; 239/13, 128, 129, 132, 132.3

[56] References Cited

U.S. PATENT DOCUMENTS

| | | | |
|---|---|---|---|
| 1,580,694 | 4/1926 | Smith | 285/924 |
| 2,649,105 | 8/1953 | Stout et al. | 285/13 |
| 2,981,072 | 4/1961 | Brewington | 285/13 |
| 3,414,001 | 12/1968 | Woodford | 285/13 |
| 3,847,421 | 11/1974 | Eschbaugh et al. | 285/924 |
| 3,856,333 | 12/1974 | Cox | 285/14 |
| 4,313,624 | 2/1982 | Zierden et al. | 285/14 |
| 4,603,890 | 8/1986 | Huppee | 285/14 |
| 4,875,709 | 10/1989 | Caroll et al. | 285/14 |

FOREIGN PATENT DOCUMENTS 471321  5/1969  Switzerland ........................ 285/14

*Primary Examiner*—Eric K. Nicholson
*Attorney, Agent, or Firm*—Faegre & Benson

[57] ABSTRACT

An apparatus for providing bleed air to exit an air outlet fitting where an air hose is connected to a turbine housing to cool the turbine and outlet fitting. The bleed air is directed through longitudinal channels outside the air hose and to an air diffuser collar where it is deflected to exit the apparatus radially.

12 Claims, 3 Drawing Sheets

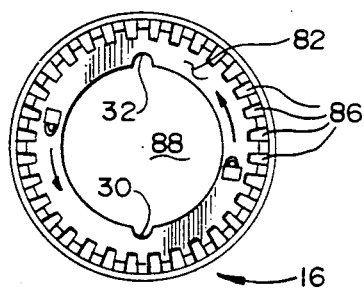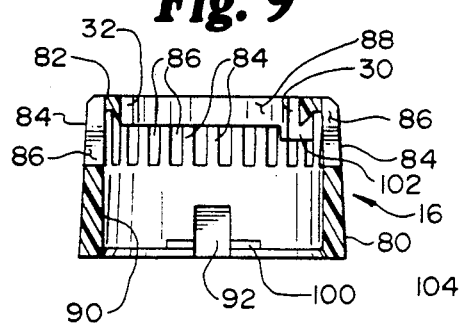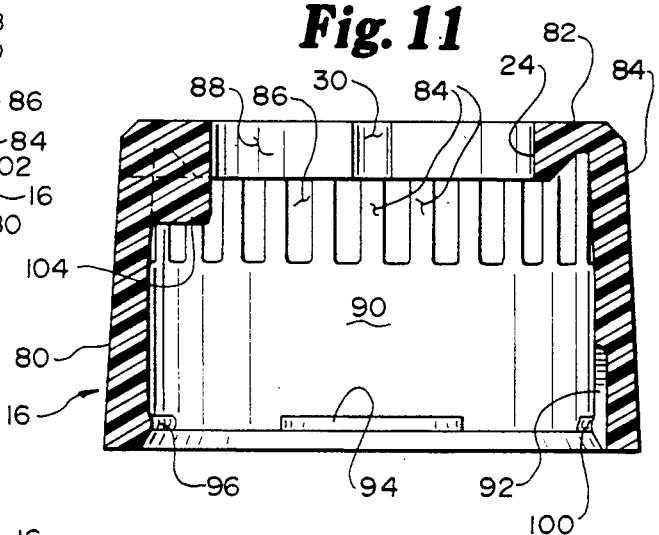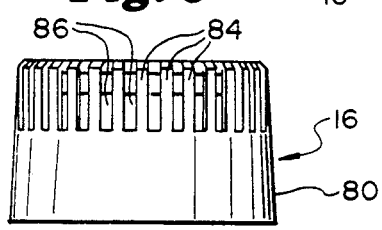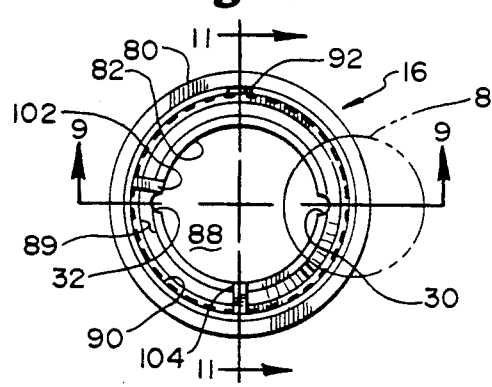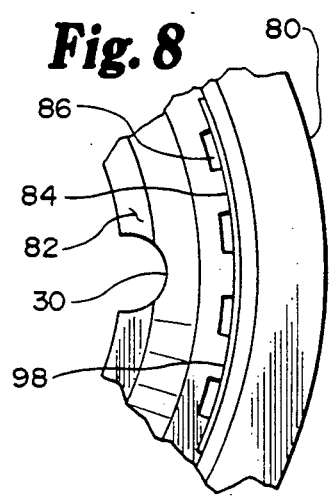

HLVP TURBINE AND HOSE COOLING APPARATUS

BACKGROUND OF THE INVENTION

In the past, turbines for providing an air supply for portable spray painting equipment were typically housed in metal enclosures. In addition to providing a mechanically durable design, the use of metal for such enclosures, while expensive, was both tolerant of higher temperatures and also effective as a heat exchanger, tending to lower the operating temperatures of such equipment.

In an effort to reduce the cost of such equipment, it has been found desirable to make turbine housings out of plastic instead of metal. The use of plastic material in such applications has encountered the difficulties that plastic is generally less tolerant of high temperatures, and furthermore is less effective as a heat transfer material. The use of plastics in turbine housings, while reducing cost and weight of such housings, has exacerbated thermal problems in such environments. In particular, the turbine motor and the turbine air outlet fitting and hose connection to the turbine must be maintained at acceptable temperatures. The present invention addresses these issues by providing for bleed air to exit an air outlet fitting where an air hose is connected to the turbine housing.

BRIEF DESCRIPTION OF THE DRAWINGS

FIG. 6 is a side elevation view of an air diffuser collar useful in the practice of the present invention.

FIG. 7 is a rear elevation view of the collar of FIG. 6.

FIG. 8 is a detail view of a portion of FIG. 7 indicated by circle 8.

FIG. 9 is a section view taken along the line 9—9 of FIG. 7.

FIG. 10 is a front elevation view of the collar of FIG. 6.

FIG. 11 is an enlarged section view taken ong line 11—11 of FIG. 7.

DETAILED DESCRIPTION

Figure 1:
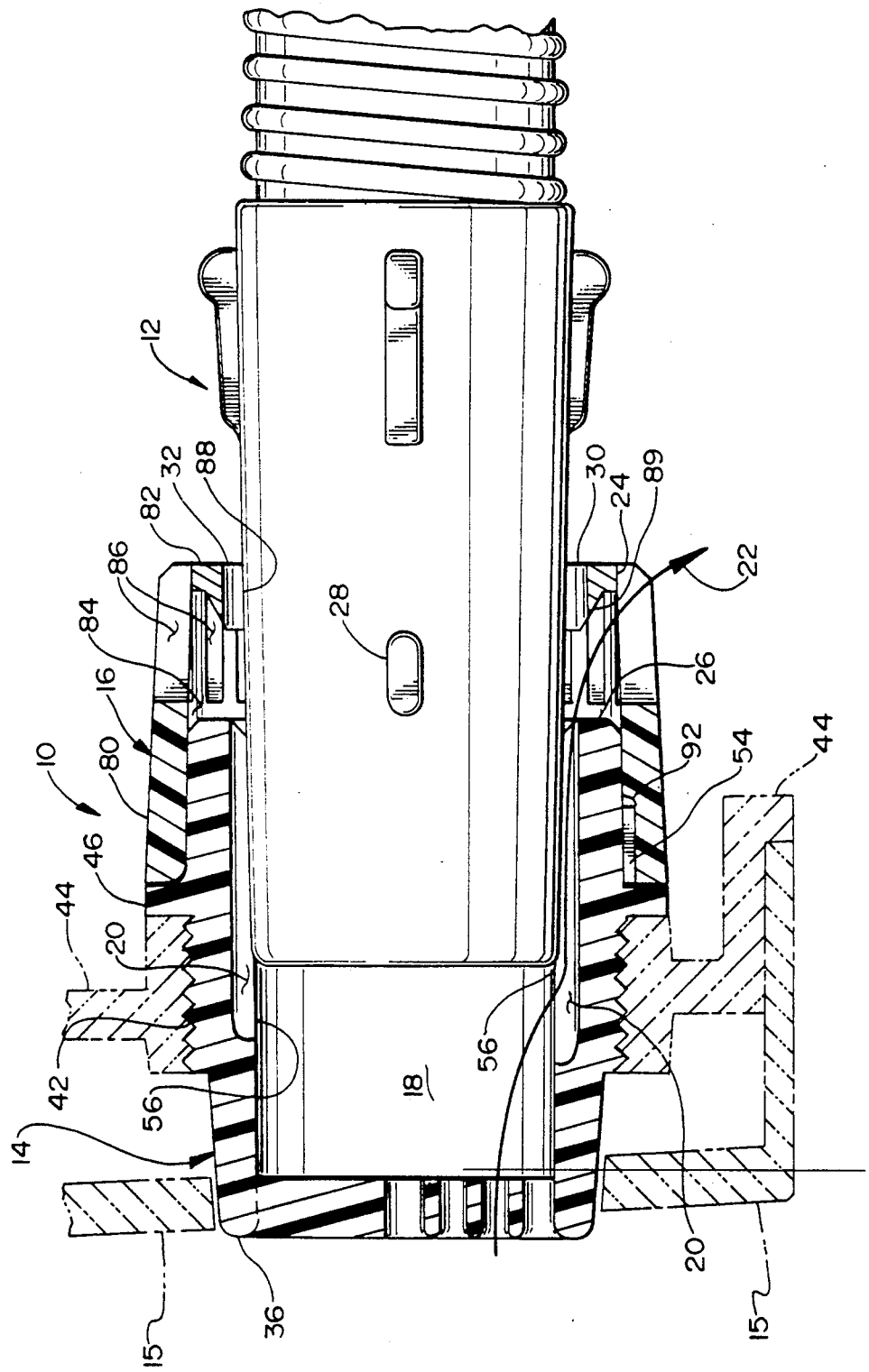
FIG. 1 shows a turbine outlet fitting and air diffuser collar in section with an air hose inserted therein and showing a portion of a turbine housing in phantom.
Figure 2:
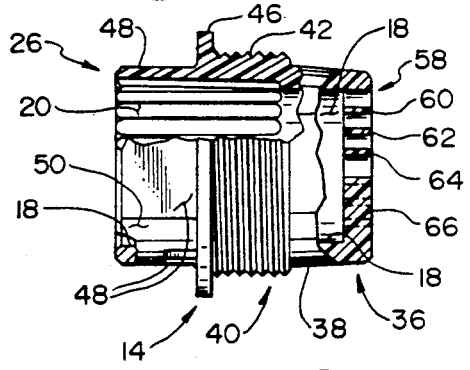
FIG. 2 is a partially cut away side elevation view of the air outlet fitting of the present invention.
Figure 3:
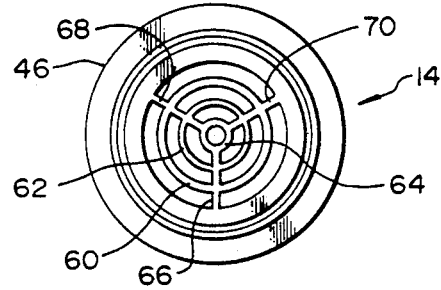
FIG. 3 is a rear elevation view of the air outlet fitting of FIG. 2.

Referring now to FIG. 1, an air bleed apparatus 10 for cooling an air suPply turbine (not shown) and hose 12 in portable spray painting equipment may be seen. Apparatus 10 preferably includes a generally cylindrical air outlet fitting 14 and an air diffuser collar 16. Apparatus 10 is adapted to receive and retain a proximal end of air hose 12 to deliver pressurized air from the turbine to a spray paint gun (not shown) connected to the distal end (not shown) of hose 12. Apparatus 10 also provides for cooling the turbine, hose 12 and apparatus 10 itself by bleeding a portion of the pressurized air flowing into fitting 14 axially initially along an interior bore 18 of fitting 14 then flowing and exteriorly of air hose 12 received in the fitting where the bleed air travels in a plurality of longitudinal passageways 20 between hose 12 and fitting 14. The bleed air then flows generally radially outwardly (as indicated by arrow 22) from fitting 14, being deflected outward along a radially extending wall 24 which is axially spaced apart from an outlet end 26 of fitting 14. No radial wall 24 prevents bleed air from blowing on an operator's hand grasping hose 12 while it is inserted in apparatus 10.

Figure 13:
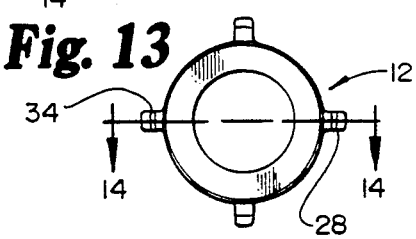
FIG. 13 is an end view of the air hose of FIG. 12.
Figure 12:
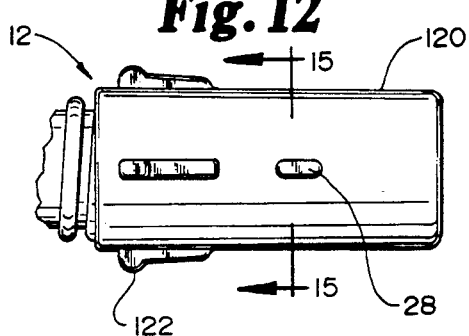
FIG. 12 is a side elevation view of an air hose end adapted to be used with the present invention.
Figure 5:
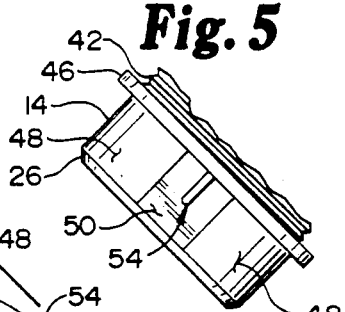
FIG. 5 is a partial side view along line 5—5 of FIG. 4.
Figure 15:
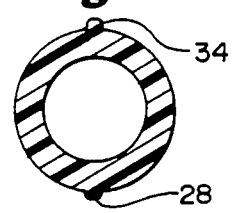
FIG. 15 is a section view taken along line 15—15 of FIG. 12.
Figure 4:
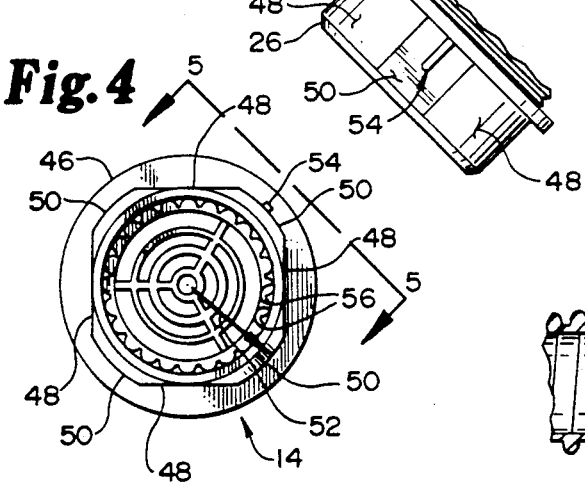
FIG. 4 is a front elevation view of the air outlet fitting of FIG. 2.
Figure 14:
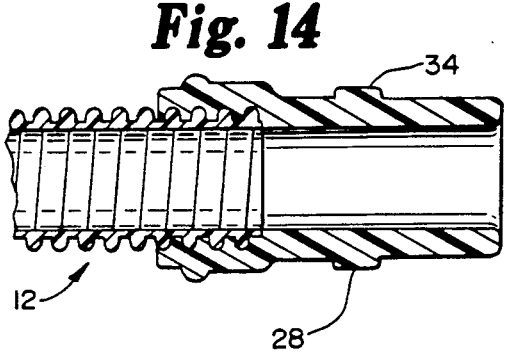
FIG. 14 is a section view taken alon9 line 14—14 of FIG. 13.

To retain hose 12 in apparatus 10, hose 12 is preferably provided with at least one radial projection 28 adapted to be moved axially through a relief 30 in wall 24 and then be moved rotationally to be retained between collar 16 and fitting 14 behind wall 24. In the embodiment shown wall 24 preferably has a second relief 32 and hose 12 has a second projection 34 (see FIGS. 13-15).

Referring now also to FIG. 2-5, air outlet fitting 14 preferably has a first end 36 having a shallow conical tapered surface 38 for providing a relatively airtight connection to an inner housing 15 of the air turbine. Bore 18 extends to the second end 26 where the bore 18 is adapted to receive the air hose 12. Fitting 14 further has an intermediate region 40 between the first and second ends 36, 26 and further has fastening means such as threads 42 for securing the fitting to an outer turbine housing 44 (see FIG. 1). Intermediate region 40 further has a flange 46. First end 26 of fitting 14 preferably has a plurality of wrench flats 48 interrupted by a plurality of arcuate surfaces 50 at a given radius 52. An axially oriented key 54 is preferably molded to extend radially outward from surface 50 beyond radius 52.

The plurality of air passageways 20 extend from intermediate region 40 to the outlet or second end 26 of fitting 14. Passageways 20 are separated by a plurality of splines or longitudinally extending radially inwardly directed lands 56.

The first or inlet end 36 of fitting 14 also preferably has a grill 58 made up of a plurality of concentric rings 60, 62, 64 held in place by radial arms 66, 68, 70, all of which are preferably molded integral with fitting 14.

Referring now to FIGS. 1 and 6-11, details of the air diffuser collar 16 may be seen. Collar 16 preferably has a solid cylindrical skirt 80 preferably having a slight conical taper. Skirt 80 is connected to radially extending wall 24 by a plurality of webs 84 extending between a plurality of radially oriented apertures 86. Wall 24 preferably has a radially extending exterior surface 82 and also has two reliefs 30, 32 as may be seen most clearly in FIGS. 7, 8, 10 and 11. Wall 82 has a cylindrical bore 88 therethrough sized to receive air hose 12. Wall 82 preferably has a conical inner surface 89. Collar 16 has a second generally cylindrical bore 90 interior of skirt 80. Bore 90 also preferably has a keyway 92 adapted to receive key 54 on fitting 14. Collar 16 also preferably has a plurality of circumferentially extending, radially inwardly projecting ribs 94, 96, 98, 100. It is to be understood that rib 100 is interrupted by keyway 92. Ribs 94-100 and radius 52 are preferably sized to provide a frictional interference type fit between the ribs of the collar and the arcuate surfaces 50 of fitting 14.

Collar 16 also preferably has a first stop wall 102 adjacent relief 32 extending radially inward within collar 16 and a second stop wall 104, preferably also extending radially inward and at approximately 90° from relief 32. It is to be understood that stop walls 102, 104 limit rotation of hose 12 by providing limits to the amount of rotational travel of projection 28 when it is received between radial wall 24 of collar 16 and the outlet end 26 of fitting 14. In particular stop wall 102 prevents rotation of air hose 12 in a first direction and stop wall 104 permits limited rotation of air hose 12 in a second direction when projections 28, 34 are in the space between wall 24 and second end 26.

Referring now to FIGS. 12-15, various details of air hose 12 may be seen. Hose 12 preferably includes a molded end 120 formed integral with hose 12. End 120 preferably has a generally cylindrical cross-section as may be seen most clearly in FIGS. 14 and 15. End 120 may also have a plurality of further projections 122 to assist in grasping hose 12 and to indicate the angular position of projection 28 when it is concealed within apparatus 10. It is to be understood that end 120 preferably has a slight conical taper to closely interfit with clearance in bore 88 and may be sized to have an interference fit in bore 18 or may be sized to have a close clearance fit therewith.

The invention is not to be taken as limited to all of the details thereof as modifications and variations thereof may be made without departing from the spirit or scope of the invention.

What is claimed is:

1. An air bleed apparatus for cooling an air supply turbine and hose in portable spray painting equipment comprising:
   (a) a generally cylindrical air outlet fitting having:
      (i) a first end having a shallow conical tapered surface for providing a relatively air tight connection to a housing of the air turbine,
      (ii) a second end having a bore adapted to receive an air hose,
      (iii) an intermediate region between the first and second ends having fastening means exterior of the fitting for securing the fitting to the housing, and
      (iv) a plurality of air passageways interior of the fitting extending from the intermediate region to the second end of the fitting for allowing air to exit the fitting exteriorly of an air hose received in the fitting.

2. The apparatus of claim 1 wherein the air passageways comprise a plurality of splines internal to the fitting and extending from the intermediate region to the second end.

3. The apparatus of claim 1 further comprising:
   (b) an air diffuser collar received on the second end of the fitting and having a plurality of radially oriented apertures extending therethrough for providing an air path from the passageways to the air ambient exterior of the fitting.

4. The apparatus of claim 3 wherein the air diffuser collar further comprises a radially extending wall having a cylindrical bore therethrough and spaced axially apart from the second end of the fitting and adapted to receive an air hose wherein the radial wall of the collar further comprises at least one relief extending from the bore radially into the wall for providing clearance for a radial projection on the air hose to permit axial passage of the radial projection into the collar and past the radial wall and the second end of the fitting is spaced sufficiently apart from the radial wall to permit rotation of the radial projection out of axial alignment with the radially extending relief in the space between the wall and the second end of the fitting such that the air hose is retained to the collar and fitting by axial interference between the radial projection and the radially extending wall.

5. The apparatus of claim 4 wherein the radially extending wall of the air diffuser collar further comprises a conical inner surface for directing bleed air radially outward.

6. The apparatus of claim 4 further comprising a first and a second stop wall on the collar, each extending radially inward in the space between the collar radial wall and the second end of the fitting, the first stop wall being positioned immediately adjacent the relief in the radial wall for preventing movement of the air hose in a first rotational direction, and the second stop wall being positioned an angular distance away from the relief in the radial wall for permitting limited movement of the air hose in a second rotational direction when the radial projection of the air hose is in the space between the radial wall of the collar and the second end of the fitting.

7. The apparatus of claim 3 wherein the air diffuser collar and the air outlet fitting further comprise mating surfaces for retaining the diffuser on the fitting.

8. The apparatus of claim 7 wherein the mating surfaces on the collar further comprise a plurality of circumferentially-extending, radially inwardly projecting ribs.

9. The apparatus of claim 8 wherein the mating surfaces on the fitting comprise a plurality of arcuate surfaces at a radius sufficient to cause a frictional interference fit between the ribs of the collar and the arcuate surfaces of the fitting.

10. The apparatus of claim 7 wherein the mating surfaces further comprise a key on one of the mating surfaces and a keyway on the other mating surface aligned with each other to permit longitudinal movement and prevent rotational movement of the collar with respect to the fitting.

11. A method of cooling a portable paint sprayer air supply turbine hose fitting comprising:
   (a) passing pressurized air into an air outlet fitting having inlet and outlet ends and mounted on a turbine housing;
   (b) bleeding a portion of the pressurized air axially along an interior bore of the fitting and exteriorly of an air hose received in the fitting, the bleed air traveling in a plurality of longitudinal passageways between the hose and the fitting; and
   (c) directing the bleed air generally radially outwardly from the fitting by deflecting the bleed air outward along a radially extending wall axially spaced apart from the outlet end of the fitting.

12. The method of claim 11 further comprising retaining the air hose received in the fitting by moving a radial projection on the air hose axially through a relief in the radially extending wall and rotating the radial projection out of alignment with the relief.

* * * * *